United States Patent
Shiraki et al.

(10) Patent No.: US 10,818,939 B2
(45) Date of Patent: Oct. 27, 2020

(54) REDOX FLOW BATTERY

(71) Applicant: Sumitomo Electric Industries, Ltd., Osaka-shi (JP)

(72) Inventors: Kosuke Shiraki, Osaka (JP); Takashi Kanno, Osaka (JP); Takefumi Ito, Osaka (JP); Masahiro Kuwabara, Osaka (JP); Hideyuki Yamaguchi, Osaka (JP); Hayato Fujita, Osaka (JP); Kiyoaki Hayashi, Osaka (JP); Kiyoaki Moriuchi, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 200 days.

(21) Appl. No.: 16/075,229

(22) PCT Filed: Feb. 3, 2016

(86) PCT No.: PCT/JP2016/053267
§ 371 (c)(1),
(2) Date: Aug. 3, 2018

(87) PCT Pub. No.: WO2017/134780
PCT Pub. Date: Aug. 10, 2017

(65) Prior Publication Data
US 2019/0067711 A1 Feb. 28, 2019

(51) Int. Cl.
*H01M 8/0273* (2016.01)
*H01M 8/18* (2006.01)
(Continued)

(52) U.S. Cl.
CPC ....... *H01M 8/0273* (2013.01); *H01M 8/0271* (2013.01); *H01M 8/18* (2013.01);
(Continued)

(58) Field of Classification Search
None
See application file for complete search history.

(56) References Cited

U.S. PATENT DOCUMENTS

2004/0170893 A1\* 9/2004 Nakaishi ............. H01M 8/0273
429/185
2004/0202915 A1 10/2004 Nakaishi et al.
(Continued)

FOREIGN PATENT DOCUMENTS

CN 1515046 A 7/2004
EP 2824747 A1 \* 1/2015 ............ H01M 8/188
(Continued)

*Primary Examiner* — Daniel S Gatewood
(74) *Attorney, Agent, or Firm* — Baker Botts, L.L.P.; Michael A. Sartori

(57) ABSTRACT

Provided is a redox flow battery in which damage is unlikely to occur in a membrane. A redox flow battery includes a pair of adjacent cell frames, each cell frame including a frame body in which a flow channel for an electrolyte is formed, and a bipolar plate disposed inside the frame body; a positive electrode and a negative electrode disposed so as to face each other between the bipolar plates of the pair of cell frames; a membrane interposed between the positive electrode and the negative electrode; a protection plate which covers the flow channel and presses edge portions of the positive electrode or the negative electrode toward the bipolar plate; and a membrane protection structure which prevents the membrane from being broken by contact between the protection plate and the membrane.

8 Claims, 7 Drawing Sheets

(51) Int. Cl.
*H01M 8/247* (2016.01)
*H01M 8/0271* (2016.01)

(52) U.S. Cl.
CPC .......... *H01M 8/188* (2013.01); *H01M 8/247* (2013.01); *Y02E 60/528* (2013.01)

(56) References Cited

U.S. PATENT DOCUMENTS

2012/0282539 A1* 11/2012 Oda ................. H01M 8/242
 429/482
2013/0309540 A1* 11/2013 Nakaishi ............ H01M 8/0297
 429/99

FOREIGN PATENT DOCUMENTS

| EP | 2824747 A1 | 1/2015 |
| EP | 3410528 A1 | 12/2018 |
| JP | 2002-367659 A | 12/2002 |

* cited by examiner

REDOX FLOW BATTERY

TECHNICAL FIELD

The present invention relates to a redox flow battery which is a storage battery.

BACKGROUND ART

Redox flow batteries (hereinafter, may be referred to as "RF batteries") are known as one type of large-capacity storage battery (refer to Patent Literature 1). Examples of applications of RF batteries include load leveling, instantaneous power failure compensation, emergency power supplies, and output smoothing of natural energy, such as solar photovoltaic power generation and wind power generation.

An RF battery performs charging and discharging by using a positive electrode electrolyte and a negative electrode electrolyte, each containing metal ions (active material) whose valence is changed by oxidation-reduction. FIG. 5 shows an operating principle diagram of a vanadium-based RF battery 100 which uses a vanadium electrolyte containing vanadium (V) ions as an active material for each of the positive electrode electrolyte and the negative electrode electrolyte. In a battery cell 100C shown in FIG. 5, the solid-line arrow indicates a charging reaction, and the dashed-line arrow indicates a discharging reaction.

An RF battery 100 includes a battery cell 100C which is separated into a positive electrode cell 102 and a negative electrode cell 103 by a membrane 101 that allows hydrogen ions to permeate therethrough. The positive electrode cell 102 contains a positive electrode 104 and is connected via conduits 108 and 110 to a positive electrode electrolyte tank 106 which stores a positive electrode electrolyte. Similarly, the negative electrode cell 103 contains a negative electrode 105 and is connected via conduits 109 and 111 to a negative electrode electrolyte tank 107 which stores a negative electrode electrolyte. The electrolytes stored in the positive electrode electrolyte tank 106 and the negative electrode electrolyte tank 107 are circulated into the positive electrode cell 102 and the negative electrode cell 103 by pumps 112 and 113, respectively, during charging and discharging.

In the RF battery 100, usually, a configuration including a cell stack in which a plurality of battery cells 100C are stacked is used. FIG. 6 is a schematic diagram of a cell stack, and FIG. 7 is a schematic exploded sectional view of a battery cell. A cell stack 200 shown in FIG. 6 includes a layered body in which cell frames 40, each including a frame body 42 provided on the periphery of a bipolar plate 41, positive electrodes 104, membranes 101, and negative electrodes 105 are stacked, and a pair of end plates 201 arranged on both ends in the stacking direction of the layered body. In the cell stack 200, rod-shaped bodies 202 are arranged to pass through the two end plates 201 and fastened with nuts 203.

In a cell frame 40, a frame body 42 is formed so as to sandwich the periphery of a bipolar plate 41 from the front and back sides. Inside the frame body 42 provided with the bipolar plate 41, a recess is formed by a surface of the bipolar plate 41 and an inner peripheral surface of the frame body 42. A positive electrode 104 is disposed on one surface side of the bipolar plate 41, and a negative electrode 105 is disposed on the other surface side. In a recess formed inside the frame body 42, an electrode (positive electrode 104 or negative electrode 105) having substantially the same size as that of the recess is held, and a space surrounded by the recess and a membrane 101 constitutes a cell (positive electrode cell 102 or negative electrode cell 103). In the cell stack 200, as shown in FIG. 6, a pair of positive and negative electrodes 104 and 105 are disposed between adjacent cell frames 40, and a membrane 101 is interposed between the positive electrode 104 and the negative electrode 105, thus constituting a battery cell 100C.

In the cell stack 200, electrolytes are circulated by liquid supply manifolds 143 and 144 and liquid discharge manifolds 145 and 146 which are provided so as to pass through the frame body 42, and liquid supply slits 143s and 144s and liquid discharge slits 145s and 146s which are formed on surfaces of the frame body 42. The positive electrode electrolyte is supplied from the liquid supply manifold 143 through the liquid supply slit 143s formed on the one surface side (the front side of the sheet) of the frame body 42 to the positive electrode 104, and discharged through the liquid discharge slit 145s to the liquid discharge manifold 145. Similarly, the negative electrode electrolyte is supplied from the liquid supply manifold 144 through the liquid supply slit 144s formed on the other surface side (the back side of the sheet) of the frame body 42 to the negative electrode 105, and discharged through the liquid discharge slit 146s to the liquid discharge manifold 146.

Usually, flow regulating portions (not shown) are formed at inner peripheries of the sides provided with the liquid supply manifolds 143, 144, the liquid discharge manifold 145, 146, the liquid supply slits 143s, 144s and the liquid discharge slits 145s, 146s, out of four sides of the frame body 42, and one end of each of the slits 143s to 146s is connected to the corresponding flow regulating portion. The flow regulating portions function to diffuse the electrolytes supplied from the liquid supply slits 143s and 144s to the positive electrode 104 and the negative electrode 105 and to collect the electrolytes discharged from the electrodes 104 and 105 to the liquid discharge slits 145s and 146s. The slits 143s to 146s and the flow regulating portions are covered with protection plates 150 made of plastic, and spaces surrounded by the slits 143s to 146s and the protection plates 150 and spaces surrounded by the flow regulating portions and the protection plates 150 constitute flow paths of the electrolytes.

CITATION LIST

Patent Literature

PTL 1: Japanese Unexamined Patent Application Publication No. 2002-367659

SUMMARY OF INVENTION

Technical Problem

A further improvement in battery performance of redox flow batteries is desired, and as one measure therefor, there is a demand for decreasing the internal resistance of batteries.

One method for decreasing the internal resistance is to decrease the thickness of a membrane. An increase in the thickness of the membrane makes permeation of hydrogen ions difficult, and increases the internal resistance of the battery. Therefore, the thickness of the membrane is preferably small. From the viewpoint of cost reduction of the RF battery, it is also desired to reduce the amount of the membrane used by decreasing the thickness of the membrane which is expensive.

However, when the thickness of the membrane decreases, the mechanical strength thereof decreases, and a break is likely to occur in portions of the membrane in contact with cell frames and edges of protection plates. When a break occurs in the membrane, there is a concern that the positive and negative electrolytes may be mixed with each other, resulting in a decrease in charging efficiency.

The present invention has been made under these circumstances, and it is an object of the present invention to provide a redox flow battery in which damage is unlikely to occur in a membrane.

Solution to Problem

A redox flow battery according to an embodiment of the present invention includes a pair of adjacent cell frames, each cell frame including a frame body in which a flow channel for an electrolyte is formed, and a bipolar plate disposed inside the frame body; a positive electrode and a negative electrode disposed so as to face each other between the bipolar plates of the pair of cell frames; a membrane interposed between the positive electrode and the negative electrode; a protection plate which covers the flow channel and presses edge portions of the positive electrode or the negative electrode toward the bipolar plate; and a membrane protection structure which prevents the membrane from being broken by contact between the protection plate and the membrane.

Advantageous Effects of Invention

In the redox flow battery, damage is unlikely to occur in the membrane.

DESCRIPTION OF EMBODIMENTS

Figure 1:
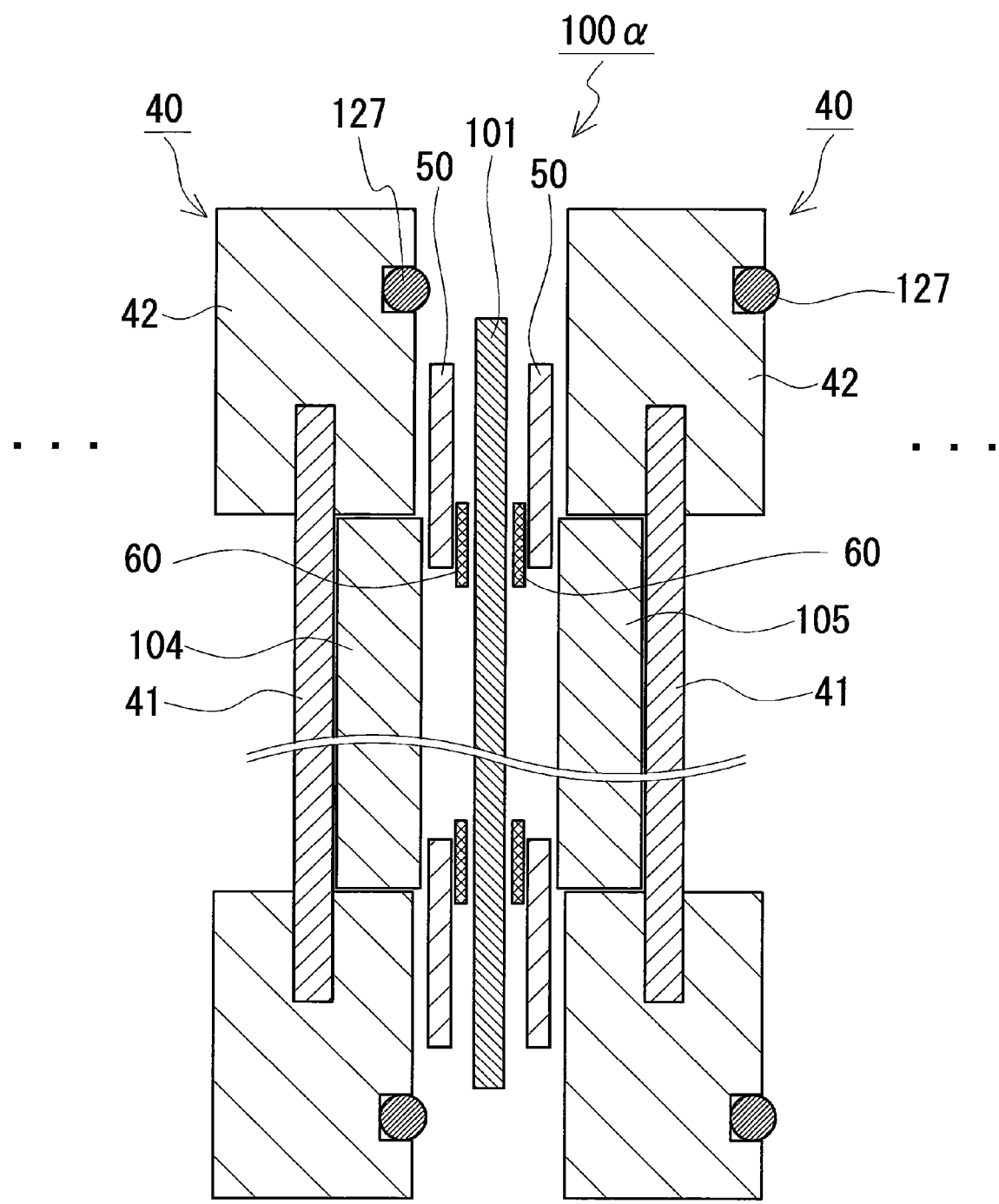
FIG. 1 is a schematic exploded sectional view showing an example of a structure of a cell of a redox flow battery according to Embodiment 1.

Description of Embodiments of the Present Invention

First, the contents of embodiments of the present invention will be enumerated and described.

(1) A redox flow battery according to an embodiment of the present invention includes a pair of adjacent cell frames, each cell frame including a frame body in which a flow channel for an electrolyte is formed, and a bipolar plate disposed inside the frame body; a positive electrode and a negative electrode disposed so as to face each other between the bipolar plates of the pair of cell frames; a membrane interposed between the positive electrode and the negative electrode; a protection plate which covers the flow channel and presses edge portions of the positive electrode or the negative electrode toward the bipolar plate; and a membrane protection structure which prevents the membrane from being broken by contact between the protection plate and the membrane.

In the redox flow battery, since the membrane protection structure is provided, it is possible to relieve stress generated in the membrane by an external force from the protection plate side, and damage, such as a break, is unlikely to occur in the membrane. Since damage of the membrane can be suppressed, the thickness of the membrane can be decreased. By decreasing the thickness of the membrane, permeation of hydrogen ions is facilitated, and the internal resistance of the battery can be decreased. Furthermore, by decreasing the thickness of the membrane, the amount of the membrane used can be reduced, and cost reduction of the redox flow battery can be achieved.

(2) According to an exemplary embodiment of the redox flow battery, the membrane protection structure includes a film cover part which is formed of a material having a lower hardness than the protection plate and covers a corner portion of the protection plate interposed between the positive electrode or the negative electrode and the membrane.

Since the film cover part which covers the corner portion of the protection plate is provided as the membrane protection structure, the membrane does not come into contact with the corner portion of the protection plate, but comes into contact with the film cover part. The expression "corner portion of the protection plate" refers to a ridgeline portion formed by a surface of the protection plate facing the membrane and an end face of the protection plate extending in the thickness direction, and the same applies hereinafter. Since the film cover part is formed of a material having a lower hardness than the protection plate, an external force acting on the membrane from the protection plate side can be relieved, and stress occurring in the membrane can be reduced. Accordingly, a large stress is unlikely to be applied locally to the membrane, and damage, such as a break, is unlikely to occur in the membrane.

(3) According to an exemplary embodiment of the redox flow battery, the protection plate and the film cover part are integrated as one body.

According to the above-described configuration, since the protection plate and the film cover part can be handled as one body, handling is facilitated, and excellent manufacturability for the redox flow battery can be achieved. Furthermore, since the two are integrated as one body, during assembly of the redox flow battery, it is possible to easily suppress shifting of the film cover part relative to the protection plate, and the corner portion of the protection plate can be easily suppressed from coming into contact with the membrane.

(4) According to an exemplary embodiment of the redox flow battery, the frame body has a rectangular shape, and the film cover part is disposed at least on long-side sides of the frame body.

In the case where the frame body has a rectangular shape, as the length of the side increases, rigidity decreases, and therefore, the long sides are likely to be expanded outward by the internal pressure of the electrolyte supplied to the inside of the frame body, and strain is likely to arise. In the case where only the protection plate of the existing redox flow battery is provided, there is a concern that, along with the expansion of the long sides, the protection plate may be shifted with respect to the membrane, resulting in damage to the membrane. Accordingly, by disposing the film cover part on the long-side sides of the frame body to which a larger stress is likely to be applied, damage of the membrane can be effectively suppressed.

(5) According to an exemplary embodiment of the redox flow battery, the film cover part has a thickness of 0.005 to 0.5 mm.

When the thickness of the film cover part is 0.005 mm or more, an external force acting on the membrane from the protection plate side can be relieved, and damage of the membrane can be easily suppressed. As the thickness of the film cover part increases, damage of the membrane can be more easily suppressed, but the size of the redox flow battery is increased. Accordingly, by setting the thickness of the film cover part to be 0.5 mm or less, damage of the membrane can be suppressed, and also an increase in the size of the redox flow battery can be suppressed.

(6) According to an exemplary embodiment of the redox flow battery, the film cover part includes at least one of a sheet, a porous material, a woven fabric, and a non-woven fabric.

As the constituent material for the film cover part, the above-described materials can be effectively used.

(7) According to an exemplary embodiment of the redox flow battery, the film cover part has a type A durometer hardness of 40 to 100.

When the type A durometer hardness of the film cover part is 100 or less, an external force acting on the membrane from the protection plate side can be easily relieved, and damage of the membrane can be more easily suppressed. As the type A durometer hardness of the film cover part decreases, damage of the membrane can be more easily suppressed, but there is a concern that the film cover part itself may be damaged by the external force. Accordingly, by setting the type A durometer hardness of the film cover part to be 40 or more, damage of the membrane can be suppressed, and also damage of the film cover part itself can be easily suppressed.

(8) According to an exemplary embodiment of the redox flow battery, the membrane protection structure includes a corner R portion in which a corner portion of the protection plate on the membrane side is rounded, and the corner R portion has a bend radius R of t/2 or more, where t is the thickness of the protection plate.

When the corner R portion in which the corner portion of the protection plate is rounded with a large bend radius is provided as the membrane protection structure, the contact area between the protection plate and the membrane can be increased. Therefore, an external force from the protection plate side can be suppressed from locally acting on the membrane, and damage, such as a break, is unlikely to occur in the membrane.

(9) According to an exemplary embodiment of the redox flow battery, the membrane protection structure includes a flexible portion on the membrane side of the protection plate, the flexible portion having a type A durometer hardness of 40 to 100.

When the flexible portion is provided on the membrane side of the protection plate as the membrane protection structure, the compressive force in the stacking direction of the constituent members (constituent members of the battery cell) can be absorbed.

Therefore, it is possible to relieve stress generated in the membrane by an external force from the protection plate side, and damage, such as a break, is unlikely to occur in the membrane.

DETAILED DESCRIPTION OF EMBODIMENTS OF THE PRESENT INVENTION

The embodiments of the present invention will be described in detail below. The scope of the present invention is not limited to the exemplary embodiments but is defined by the appended claims, and is intended to include all modifications within the meaning and scope equivalent to those of the claims.

Embodiment 1

Figure 5:
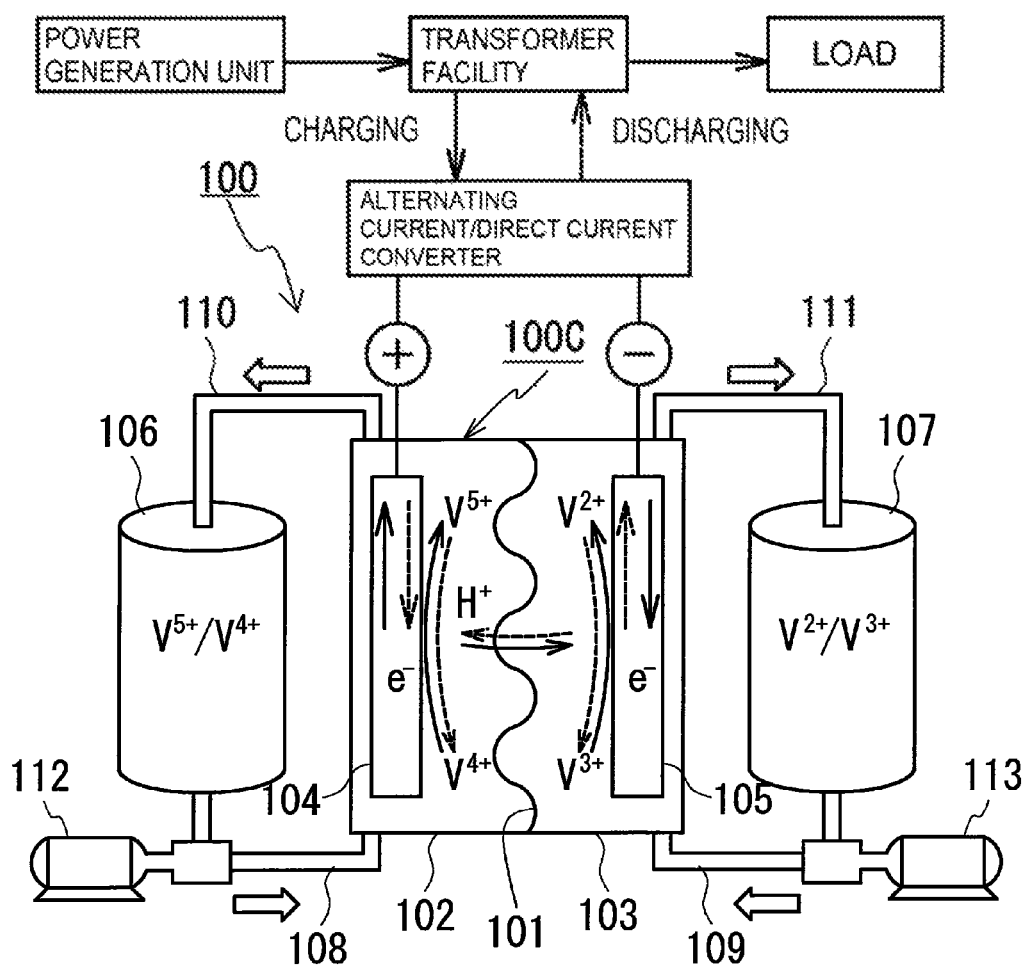
FIG. 5 is a schematic principle diagram of a redox flow battery.

A redox flow battery (RF battery) 100α according to Embodiment 1 includes, as in the existing RF battery 100 described with reference to FIG. 5, a battery cell 100C, a positive electrode circulation mechanism (a positive electrode electrolyte tank 106, conduits 108 and 110, and a pump 112), and a negative electrode circulation mechanism (a negative electrode electrolyte tank 107, conduits 109 and 111, and a pump 113). The battery cell 100C is used in the form of a cell stack 200 shown in FIG. 6. The battery cell 100C includes, as shown in FIG. 1, a pair of adjacent cell frames 40; a positive electrode 104, a negative electrode 105, and a membrane 101 which are disposed between bipolar plates 41 of the pair of cell frames 40; and a protection plate 50 disposed on a surface of a frame body 42 of each of the cell frames 40. One of the characteristics of the RF battery 100α according to Embodiment 1 is that it includes a membrane protection structure which prevents the membrane 101 from being broken by contact between the protection plate 50 and the membrane 101. In the Embodiment 1 described here, a film cover part 60 which covers a corner portion of the protection plate 50 is provided as the membrane protection structure. In Embodiment 1, one of the differences from the existing RF battery 100 is that the film cover part 60 is provided, and other than this, the same configuration as that of the existing RF battery 100 can be used. Therefore, the same components are designated by the same reference numerals, and a detailed description thereof will be omitted. The individual components will be described below in detail with reference to mainly FIG. 1.

[Cell Frame]

A pair of cell frames 40 are composed of the same material, each cell frame 40 including a frame body 42 in which a flow channel for an electrolyte is formed, and a bipolar plate 41 disposed inside the frame body 42. The frame body 42 is formed so as to sandwich the periphery of the bipolar plate 41 from the front and back sides, and is integrated with the bipolar plate 41, for example, by injection molding or the like. Accordingly, the frame body 42 is thicker than the bipolar plate 41, and stepped surfaces are formed at the boundary between the frame body 42 and the bipolar plate 41. Because of the presence of the stepped surfaces, in each cell frame 40, a recess is formed by each of one surface and the other surface of the bipolar plate 41 and an inner peripheral surface of the frame body 42 inside the frame body 42. A positive electrode 104 and a negative electrode 105 are held in the respective recesses. In this example, in each cell frame 40, both the frame body 42 and the bipolar plate 41 have a rectangular external shape.

The frame body 42 includes, as in the existing configuration, liquid supply manifolds 143 and 144 and liquid discharge manifolds 145 and 146 (FIG. 6) which are provided so as to pass through from the front side to the back side, liquid supply slits 143s and 144s and liquid discharge slits 145s and 146s (FIG. 6) which are formed on front and back surfaces, and flow regulating portions (not shown) which extend from the slits 143s to 146s along the inner peripheral edge of the frame body 42.

The bipolar plate 41 and the frame body 42 can be formed of known materials. Examples of the constituent material for the bipolar plate 41 include carbon plastics (plastics incorporated with carbon), and examples of the constituent material for the frame body 42 include plastics, such as polyvinyl chloride resins, polypropylene, polyethylene, fluorine resins, and epoxy resins.

A sealing member 127, such as an O-ring, is arranged on the outer periphery of the frame body 42. The O-ring is compressed when the cell frames 40 are stacked and fastened together, and functions to seal electrolytes.

[Electrode]

The positive electrode 104 and the negative electrode 105 are disposed so as to face each other between the bipolar plates 41 of the pair of cell frames 40. Each of the positive electrode 104 and the negative electrode 105 has substantially the same size and the same shape as those of the recess formed by each of one surface and the other surface of the bipolar plate 41 and an inner peripheral surface of the frame body 42, at the time when the cell frames 40 are compressed. For convenience of explanation, FIG. 1 shows the individual members disposed with a space therebetween. However, actually, since the individual members are compressed in the stacking direction (in the left-right direction of the sheet in FIG. 1), no space occurs.

The positive electrode 104 and the negative electrode 105 each can be formed of a known material, and is preferably formed of a porous material. For example, the positive electrode 104 and the negative electrode 105 each can be formed of carbon felt, carbon cloth, carbon paper, or the like.

[Membrane]

The membrane 101 is an ion-exchange membrane interposed between the positive electrode 104 and the negative electrode 105. The thickness of the membrane 101 is preferably 1 to 50 µm. When the thickness of the membrane 101 is 50 µm or less, ion permeation is easily performed, and the internal resistance of the battery can be decreased. Furthermore, by decreasing the thickness of the membrane 101, the amount of the membrane 101 used can be reduced, and cost reduction of the RF battery 100α can be achieved. The thickness of the membrane 101 is more preferably 40 µm or less, in particular, 30 µm or less.

In this example, the membrane 101 has a size that is a little larger than each of the positive electrode 104 and the negative electrode 105 and does not reach the outer peripheral edge of the frame body 42. The membrane 101 may have a size so as to be arranged outward the sealing member 127.

The membrane 101 can be formed of a known material. For example, the membrane 101 may be formed of a sulfonated copolymer of styrene and divinylbenzene, a copolymer of perfluorosulfonic acid and polytetrafluoroethylene, or the like.

[Electrolyte]

As the positive electrode electrolyte and the negative electrode electrolyte, known electrolytes can be used. For example, as shown in FIG. 5, vanadium-based electrolytes in which vanadium ions are used as an active material for each of positive and negative electrode active materials can be suitably used. In addition, iron ($Fe^{2+}/Fe^{3+}$)-chromium ($Cr^{3+}/Cr^{2+}$)-based electrolytes in which iron (Fe) ions are used as a positive electrode active material and chromium (Cr) ions are used as a negative electrode active material, and manganese ($Mn^{2+}/Mn^{3+}$)-titanium ($Ti^{4+}/Ti^{3+}$)-based electrolytes in which manganese (Mn) ions are used for a positive electrode electrolyte and titanium (Ti) ions are used for a negative electrode electrolyte can be suitably used.

[Protection Plate]

The protection plate 50 is a plate disposed on a surface of a frame body 42 of each of the cell frames 40 so as to cover a flow channel (a liquid supply slit 143s or 144s, a liquid discharge slit 145s or 146s, and flow regulating portions) formed on the surface of the frame body 42. By covering the flow channel with the protection plate 50, a flow path for the electrolyte is formed. The protection plate 50 has a size that allows the protection plate 50 to cover the flow channel of the frame body 42 and to press edge portions of the positive electrode 104 (negative electrode 105) toward the bipolar plate 41. When the edge portions of the electrodes 104 and 105 are pressed toward the bipolar plates 41 by the protection plates 50, the positive electrode 104 and the negative electrode 105 are suppressed from slipping off from the recesses of the cell frames 40 when the cell frames 40 are stacked, and workability can be improved.

The thickness of the protection plate 50 is preferably 100 to 2,000 µm. When the thickness of the protection plate 50 is 100 µm or more, the flow path of the electrolyte can be formed, and each of the electrodes 104 and 105 can be pressed toward the bipolar plate 41. As the thickness of the protection plate 50 increases, the size in the stacking direction of the cell frame 40 increases. Accordingly, by setting the thickness of the protection plate 50 to be 2,000 µm or less, an increase in the size of the redox flow battery 100α can be suppressed. The thickness of the protection plate 50 is more preferably 1,500 µm or less, in particular, 1,000 µm or less. Note that a groove section (not shown) corresponding to the external shape of the protection plate 50 is formed in the frame body 42 so that the protection plate 50 can be easily positioned. Accordingly, the surface of the protection plate 50 is flush with the surface of the frame body 42.

Figure 6:
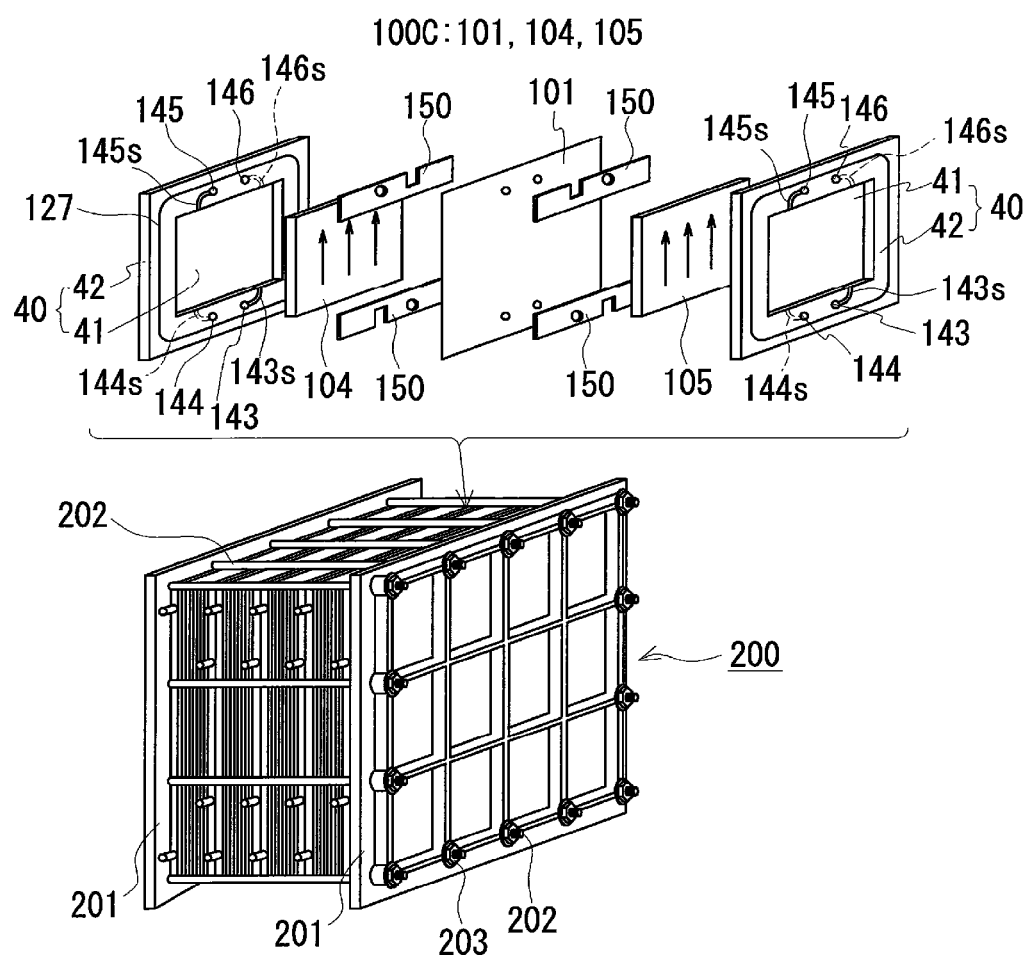
FIG. 6 is a schematic diagram of a cell stack provided in a redox flow battery.
Figure 7:
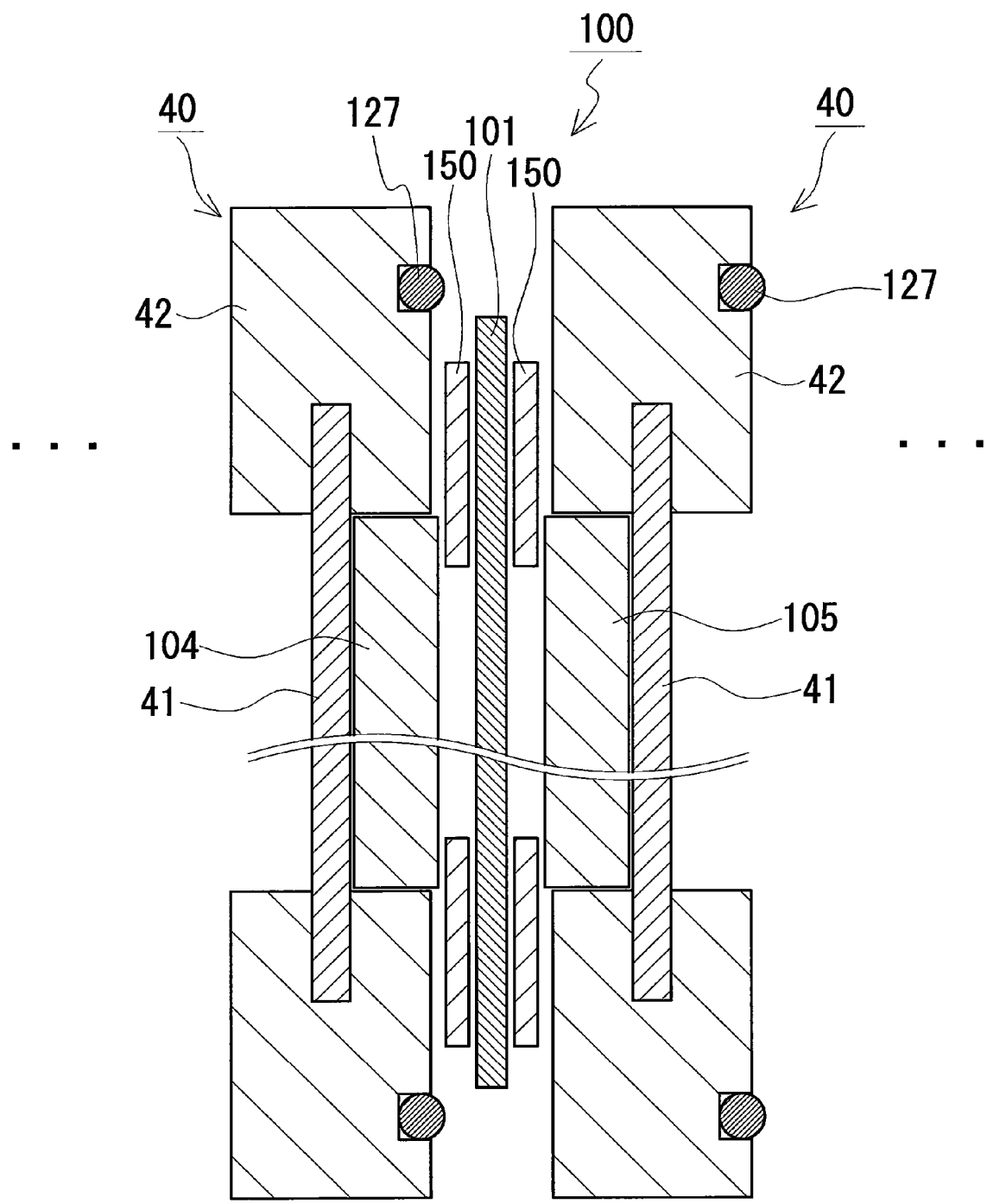
FIG. 7 is a schematic exploded sectional view showing an example of a structure of a cell of an existing redox flow battery.

The protection plate 50 may be a frame-shaped plate that is arranged over the entire periphery of the frame body 42, or may consist of a pair of long plates that are arranged on facing sides provided with a flow channel in the frame body 42 (refer to FIG. 6).

The protection plate 50 can be formed of a known material. For example, the protection plate 50 may be formed of a material having acid resistance and insulating properties, such as a polyvinyl chloride-based resin. Preferably, the protection plate 50 has a type D durometer hardness of 30 or more. When the type D durometer hardness of the protection plate 50 is 30 or more, at the time when the cell frames 40 are fastened together, the protection plate 50 can be easily suppressed from penetrating into the flow channel formed in the surface of the frame body 42 to narrow the flow path of the electrolyte, and each the positive electrode 104 and the negative electrode 105 is easily pressed toward the bipolar plate 41. The type D durometer hardness of the protection plate 50 is more preferably 40 or more, in particular, 50 or more. On the other hand, when the type D durometer hardness of the protection plate 50 is excessively large, there is a concern that the frame body 42 may be abraded. Therefore, the Rockwell hardness of the protection plate 50 is preferably 150 or less in the R scale. The Rockwell hardness of the protection plate 50 is more preferably 140 or less, in particular, 130 or less, in the R scale.

[Film Cover Part]

The film cover part 60 is a soft member which is formed of a material having a lower hardness than the protection plate 50 and covers a corner portion of the protection plate 50 interposed between the positive electrode 104 (negative electrode 105) and the membrane 101. When the film cover part 60 is provided, the membrane 101 does not come into contact with the corner portion of the protection plate 50, but comes into contact with the film cover part 60. Since the film cover part 60 is a soft member, an external force acting on the membrane 101 from the protection plate 50 side can be relieved by the film cover part 60, and damage, such as a break, can be suppressed from occurring in the membrane 101.

The film cover part 60 is provided in a region where the frame body 42 is deformed under the internal pressure of the electrolyte supplied to the inside of the frame body 42. In the region where the frame body 42 is likely to be deformed, stress is likely to be applied to the protection plate 50 disposed on the frame body 42, and the membrane 101 is likely to be broken under the stress. Accordingly, by disposing the film cover part 60 in the region where the frame body 42 is likely to be deformed, the stress can be relieved by the film cover part 60, and damage of the membrane 101 can be effectively suppressed. For example, in the case where the frame body 42 has a rectangular shape, the film cover part 60 is preferably disposed at least on long-side sides of the frame body 42. Of course, the film cover part 60 may be arranged over the entire periphery of the frame body 42. Furthermore, the film cover part 60 may be arranged so as to be dispersed discontinuously in the longitudinal direction of the protection plate 50.

The film cover part 60 is formed of a material having resistance to electrolyte and a lower hardness than the protection plate 50. Preferably, the film cover part 60 has a type A durometer hardness of 40 to 100. When the type A durometer hardness of the film cover part 60 is 100 or less, an external force acting on the membrane 101 from the protection plate 50 side can be easily relieved, and damage of the membrane 101 can be easily suppressed. As the type A durometer hardness of the film cover part 60 decreases, damage of the membrane 101 can be more easily suppressed, but there is a concern that the film cover part 60 itself may be damaged by the external force. Accordingly, by setting the type A durometer hardness of the film cover part 60 to be 40 or more, damage of the membrane 101 can be suppressed, and also damage of the film cover part 60 itself can be easily suppressed. More preferably, the type A durometer hardness of the film cover part 60 is 50 to 90, in particular, 60 to 80.

The film cover part 60 can be formed of an appropriate material having acid resistance and insulating properties, such as a plastic, rubber, or elastomer. Examples of the plastic include ultra-low density polyethylene. Examples of the elastomer include thermoplastic elastomers, such as styrene elastomers and olefin elastomers. The film cover part 60 may be composed of a sheet or material having pores. Examples of the material having pores include porous materials, and woven fabrics and non-woven fabrics which are composed of fibers.

Preferably, the film cover part 60 has a thickness of 0.005 to 0.5 mm. When the thickness of the film cover part 60 is 0.005 mm or more, an external force acting on the membrane 101 from the protection plate 50 side can be relieved, and damage of the membrane 101 can be easily suppressed. More preferably, the thickness of the film cover part 60 is 0.05 mm or more, in particular 0.1 mm or more. As the thickness of the film cover part 60 increases, damage of the membrane 101 can be more easily suppressed, but the size of the RF battery 100α is increased. Accordingly, by setting the thickness of the film cover part 60 to be 0.5 mm or less, damage of the membrane 101 can be suppressed, and also an increase in the size of the RF battery 100α can be suppressed.

The film cover part 60 is disposed so as to cover a corner portion of the protection plate 50 interposed between the positive electrode 104 (negative electrode 105) and the membrane 101. The film cover part 60 merely needs to be able to prevent the corner portion of the protection plate 50 from coming into contact with the membrane 101. The film cover part 60 may not extend from the corner portion of the protection plate 50 to a position overlapping with the positive electrode 104 (negative electrode 105). Of course, the film cover part 60 may be disposed so as to extend from the corner portion of the protection plate 50 to the position overlapping with the positive electrode 104 (negative electrode 105). The film cover part 60 is disposed so as to cover at least one of the two surfaces constituting the corner portion of the protection plate 50. The film cover part 60 can round the corner portion on the membrane 101 side.

A film cover part 60 having a uniform thickness may be disposed so as to partially or entirely overlap with a surface of a protection plate 50 having a uniform thickness. FIG. 1 shows a state in which the film cover part 60 partially overlaps with the protection plate 50. In addition, a stepped portion corresponding to the external shape of a film cover part 60 may be provided in a protection plate 50 (the thickness is reduced by the thickness of the stepped portion), and the film cover part 60 may be disposed in the stepped portion. In this case, by setting the thickness of the film cover part 60 to be equal to the thickness of the stepped portion, the surface of the protection plate 50 can be made flush with the surface of the film cover part 60. Furthermore, a thin part may be provided in each of the protection plate 50 and the film cover part 60, and the thin parts may be disposed so as to overlap with each other. In this case, by setting the total thickness of the two thin parts to be equal to the thickness of the protection plate 50 other than the thin part, the surface of the protection plate 50 can be made flush with the surface of the film cover part 60.

The film cover part 60 can be formed as a separate member from the protection plate 50. In this case, at the time of assembling the battery cell 100C, the film cover part 60 may be disposed at a predetermined position of the protection plate 50 and fixed at the predetermined position by the fastening pressure between the cell frames 40. Furthermore, by bonding the film cover part 60 to the predetermined position of the protection plate 50 with an adhesive or the like, the two members 50 and 60 can be more firmly fixed to each other. In addition, the film cover part 60 and the protection plate 50 can be integrated as one body in advance. In this case, the film cover part 60 can be laminated to the protection plate 50 with heat, a solvent, an adhesive, or the like. Furthermore, a plastic, rubber, or thermoplastic elastomer within a predetermined range may be melted and applied by coating, with a predetermined thickness, to the protection plate 50. Furthermore, after dissolving a plastic, rubber, or thermoplastic elastomer within a predetermined range in a solvent, the resulting solution may be applied by coating to the protection plate 50 to give a predetermined thickness when dried. In the case where the protection plate 50 and the film cover part 60 are integrated as one body in advance, at the time of assembling the battery cell 100C, handling is facilitated as the one body.

[Effects]

In the RF battery 100α according to Embodiment 1, since the film cover part 60 formed of a material having a lower hardness than the protection plate 50 is provided so as to cover the corner portion of the protection plate 50, the corner portion of the protection plate 50 and the membrane 101 are not brought into contact with each other. In some cases, strain may occur in the frame body 42 due to the internal pressure of the electrolyte supplied to the inside of the frame body 42 of the cell frame 40. Because of the strain, stress is applied to the protection plate 50 disposed on the inner peripheral portion of the frame body 42, and the stress tends to be highest at the corner portion and its vicinity of the protection plate 50 interposed between the positive electrode 104 (negative electrode 105) and the membrane 101. Accordingly, by disposing the film cover part 60 so as to cover the corner portion of the protection plate 50, an external force acting on the membrane 101 through the protection plate 50 can be relieved by the film cover part 60, and the membrane 101 becomes unlikely to be damaged. Since damage of the membrane 101 can be suppressed, the thickness of the membrane 101 can be decreased.

Modification Example 1-1

Figure 2:
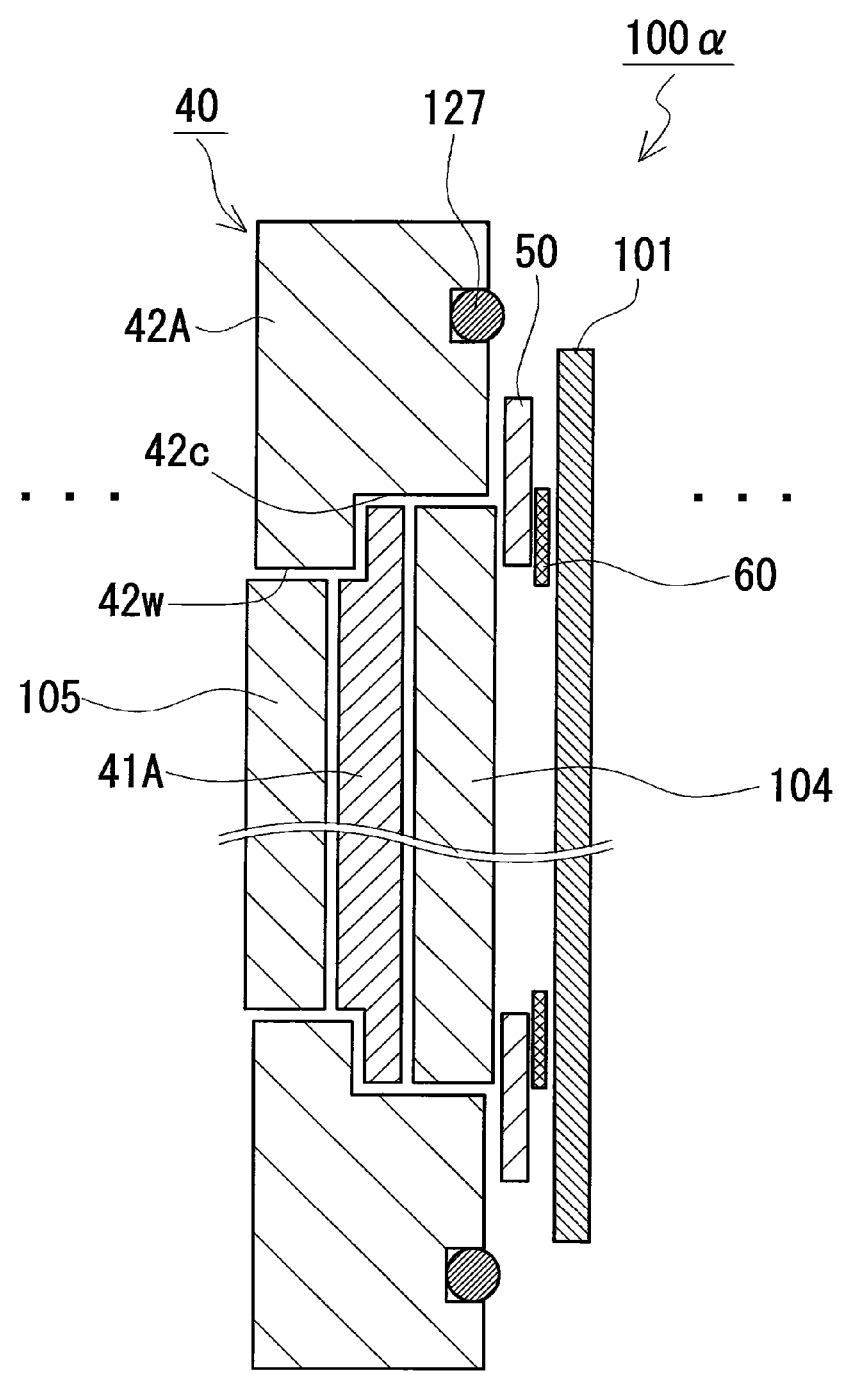
FIG. 2 is a schematic exploded sectional view showing an example of a structure of a cell of a redox flow battery according to Modification Example 1-1.

As a modification example 1-1 of Embodiment 1, as shown in FIG. 2, a cell frame 40 may have a structure in which a bipolar plate 41A is fitted into an inner peripheral edge recess 42c of a frame body 42A. Although FIG. 2 shows only one of a pair of cell frames 40, the other cell frame 40 has the same structure. The frame body 42A has an opening 42w passing therethrough in the thickness direction thereof, and the bipolar plate 41A is disposed so as to fill the opening 42w. Furthermore, a periphery of the frame body 42A surrounding around the opening 42w has a smaller thickness than the rest of the frame body 42A, and the thin portion constitutes the inner peripheral edge recess 42c for fitting the bipolar plate 41A. The bipolar plate 41A has a thin part having a smaller thickness than the rest of the bipolar plate 41A, the thin part being engaged with the inner peripheral edge recess 42c of the frame body 42A. The thin part of the bipolar plate 41A faces the inner peripheral edge recess 42c of the frame body 42A, and the rest of the bipolar plate 41A other than the thin part is fitted into the opening 42w of the frame body 42A. Thus, the bipolar plate 41A is disposed inside the frame body 42A. In each cell frame 40, a recess is formed inside the frame body 42A by each of one surface and the other surface of the bipolar plate 41A and the inner peripheral surface of the frame body 42A. A positive electrode 104 and a negative electrode 105 are held in the respective recesses.

Embodiment 2

Figure 3:
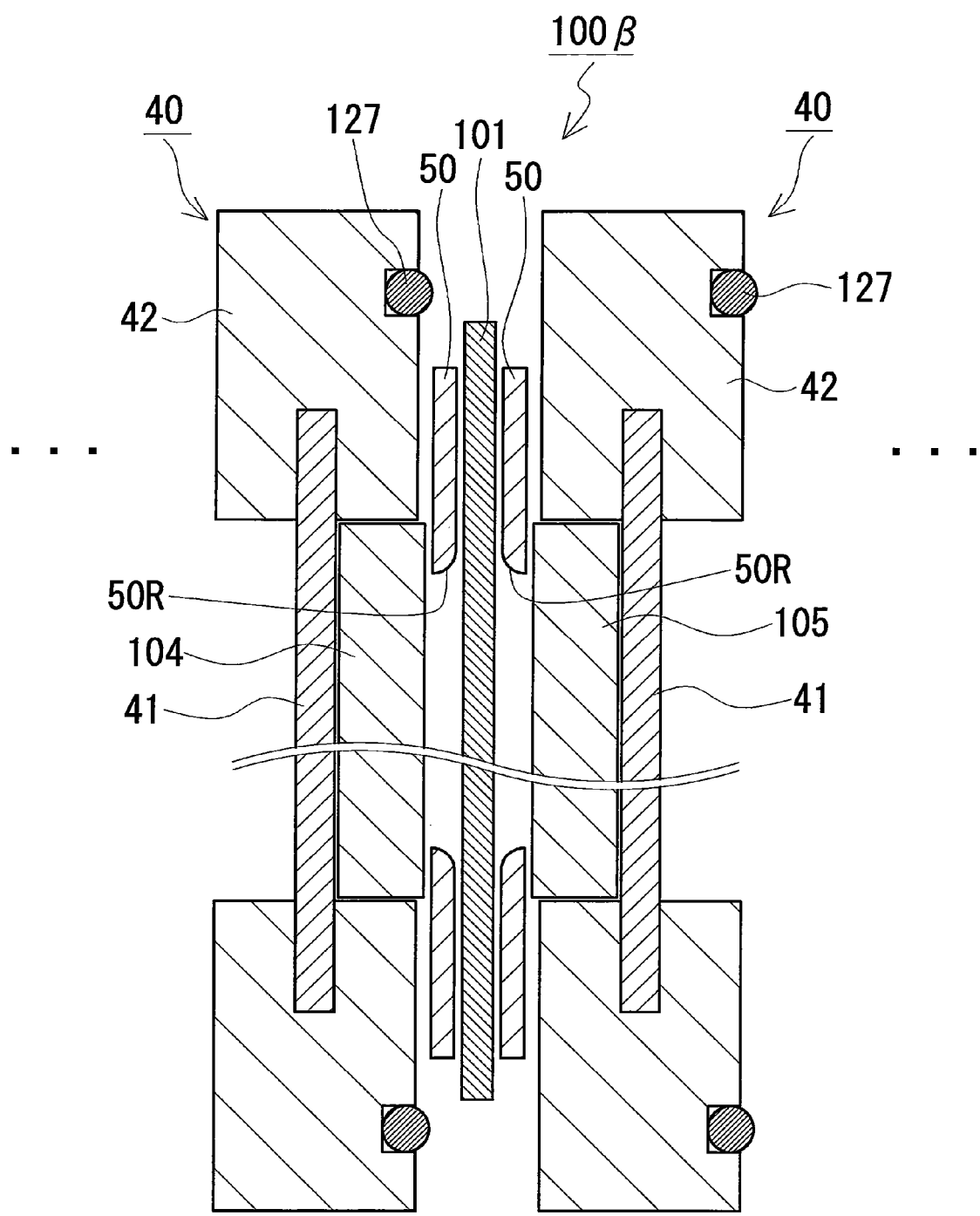
FIG. 3 is a schematic exploded sectional view showing an example of a structure of a cell of a redox flow battery according to Embodiment 2.

In Embodiment 2, a description will be made on an RF battery 100β which does not include a film cover part 60, but includes a corner R portion 50R in which a corner portion on the membrane 101 side of a protection plate 50 is rounded, as a membrane protection structure, as shown in FIG. 3. The RF battery 100β according to Embodiment 2 differs from Embodiment 1 in that the film cover part 60 is not provided and that the corner R portion 50R is provided on the protection plate 50. Other than this, the configuration is the same as that of Embodiment 1, and therefore, the difference from Embodiment 1 will be mainly described below.

In Embodiment 2, the membrane 101 comes into contact with the corner portion of the protection plate 50. The stress occurring in the protection plate 50 due to the strain generated in the frame body 42 tends to be highest at the corner portion and its vicinity of the protection plate 50 interposed between the positive electrode 104 (negative electrode 105) and the membrane 101. Accordingly, in the protection plate 50 of Embodiment 2, the corner portion on the membrane 101 side of the protection plate 50 is formed as a corner R portion 50R with a rounded bend radius R. Thereby, even when the membrane 101 comes into contact with the corner portion of the protection plate 50, since the corner R portion 50R of the protection plate 50 is rounded, the membrane 101 becomes unlikely to be damaged.

The corner R portion 50R of the protection plate 50 has a bend radius R of t/2 or more, where t is the thickness of the protection plate 50. As the bend radius of the corner R portion 50R increases, the sharpness of the contact surface with respect to the membrane 101 can be decreased, but a sharper contact surface with respect to the positive electrode 104 and the negative electrode 105 side is formed. Therefore, the bend radius of the corner R portion 50R is preferably 5 t or less. More preferably, the bend radius of the corner R portion 50R is t to 4 t, or 2 t to 3 t.

A film cover part 60, which is described in Embodiment 1, may be further disposed so as to cover the corner R portion 50R provided on the protection plate 50. That is, the film cover part 60 and the corner R portion 50R are provided as the membrane protection structure. Thereby, it is possible to further suppress a large stress that may damage the membrane 101 from locally acting on the membrane 101.

Regarding Embodiment 2, the cell frame 40 can also have a structure in which a bipolar plate is fitted into an inner peripheral edge recess of a frame body, as described in Modification Example 1-1.

Embodiment 3

Figure 4:
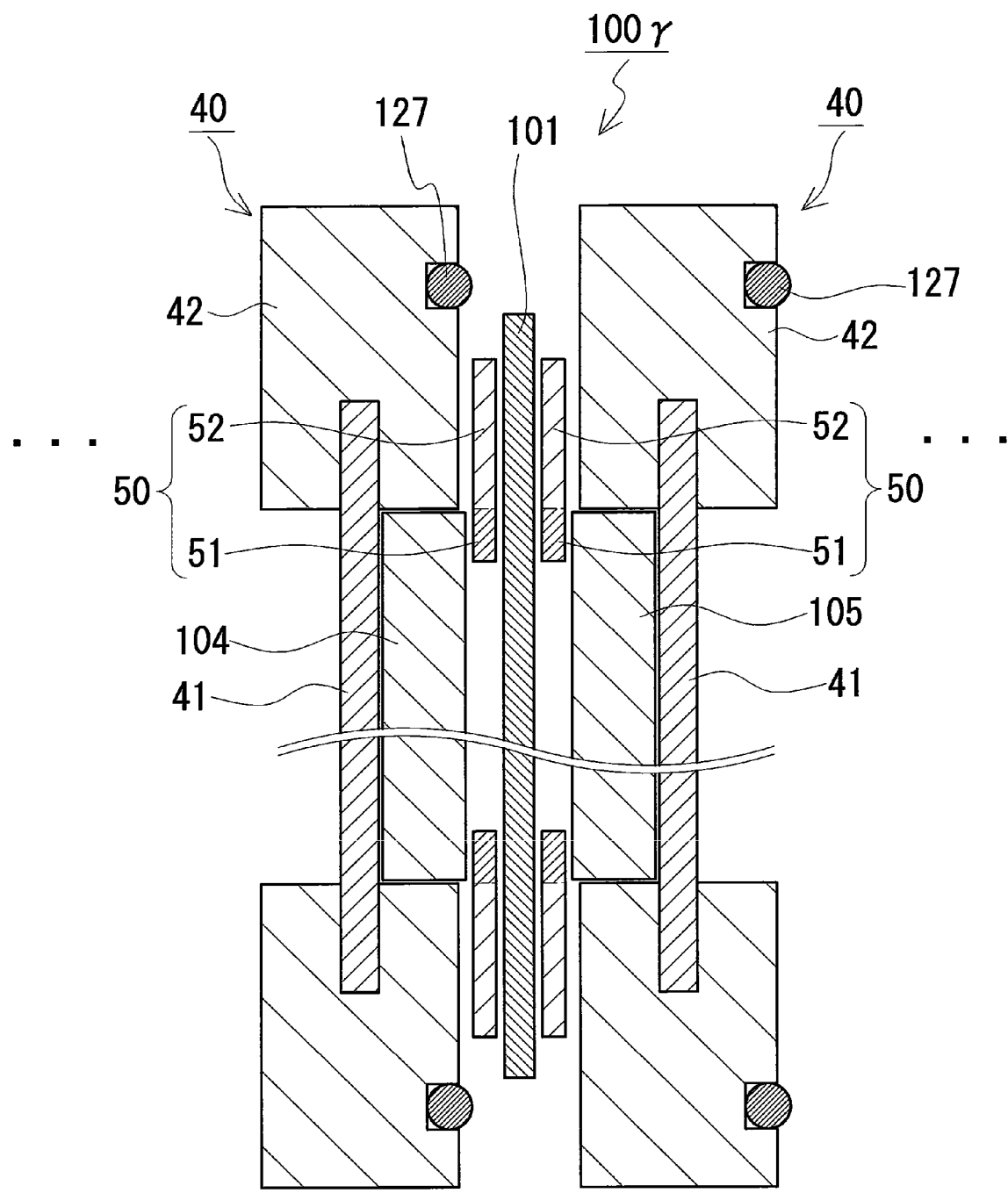
FIG. 4 is a schematic exploded sectional view showing an example of a structure of a cell of a redox flow battery according to Embodiment 3.

In Embodiment 3, a description will be made on an RF battery 100γ which does not include a film cover part 60, but includes, as a membrane protection structure, a low hardness portion 51 (flexible portion) on the membrane 101 side of a protection plate 50, the low hardness portion 51 having a type A durometer hardness of 40 to 100, as shown in FIG. 4. The RF battery 100γ according to Embodiment 3 differs from Embodiment 1 in that the film cover part 60 is not provided and that the low hardness portion 51 is provided on the protection plate 50. Other than this, the configuration is the same as that of Embodiment 1, and therefore, the difference from Embodiment 1 will be mainly described below.

The low hardness portion 51 provided on the protection plate 50 is a portion of the protection plate 50 at least interposed between the positive electrode 104 (negative electrode 105) and the membrane 101. A portion of the protection plate 50 interposed between the frame body 42 and the membrane 101 is preferably a high hardness portion 52 composed of the same material as the existing structure. When the high hardness portion 52 is present on the frame body 42 side, the protection plate 50 can be easily suppressed from penetrating into the flow channel formed in the surface of the frame body 42 to narrow the flow path of the electrolyte, and each the positive electrode 104 and the negative electrode 105 is easily pressed toward the bipolar plate 41. The low hardness portion 51 may be provided entirely on the protection plate 50.

The low hardness portion 51 provided on the membrane 101 side of the protection plate 50 has a type A durometer hardness of 40 to 100. When the type A durometer hardness of the low hardness portion 51 is 100 or less, the compressive force in the stacking direction of the constituent members of the battery cell can be absorbed. Therefore, it is possible to relieve stress generated in the membrane 101 by an external force from the protection plate 50 side, and damage of the membrane 101 can be easily suppressed. As the type A durometer hardness of the low hardness portion 51 decreases, damage of the membrane 101 can be more easily suppressed, but there is a concern that the low hardness portion 51 may be damaged by the compressive force. Accordingly, by setting the type A durometer hardness of the low hardness portion 51 to be 40 or more, damage of the membrane 101 can be suppressed, and also damage of the low hardness portion 51 is easily suppressed. The type A durometer hardness of the flexible portion is preferably 50 to 90, in particular, 60 to 80. The low hardness portion 51 can be formed of an appropriate material having acid resistance and insulating properties, such as a plastic, rubber, or elastomer, as in the film cover part 60 described in Embodiment 1.

A film cover part 60, which is described in Embodiment 1, may be further disposed so as to cover the corner portion of the protection plate 50 provided with the low hardness portion 51. Furthermore, instead of disposing a film cover part 60, a corner R portion 50R may be provided on the corner portion of the protection plate 50 provided with the low hardness portion 51. Furthermore, a corner R portion 50R may be provided on the corner portion of the protection plate 50 provided with the low hardness portion 51, and a film cover part 60 may be disposed so as to cover the corner R portion 50R. That is, at least one of a film cover part 60, a corner R portion 50R, and a low hardness portion 51 is provided as the membrane protection structure. By providing a plurality of structures as the membrane protection structure, it is possible to further suppress a large stress that may damage the membrane 101 from locally acting on the membrane 101.

Regarding Embodiment 3, the cell frame 40 can also have a structure in which a bipolar plate is fitted into an inner peripheral edge recess of a frame body, as described in Modification Example 1-1.

Test Example 1

In Test Example 1, the occurrence of a break of a membrane, depending on the presence or absence of a film cover part, was checked. In this example, RF batteries having a single-cell structure were fabricated, in which a positive electrode, a membrane, and a negative electrode were disposed between a pair of cell frames, and a protection plate was disposed on a frame body of each cell frame (refer to FIG. 1). The protection plate used was composed of polyvinyl chloride (PVC) having a Rockwell hardness of 120 in the R scale.

In Sample No. 1, a film cover part was disposed so as to cover a corner portion of the protection plate interposed between each of the electrodes and the membrane (refer to FIG. 1). The film cover part used was composed of a styrene elastomer having a type A durometer hardness of 80. The film cover part was immersed in a vanadium sulfate electrolyte at 85° C.×7 days, and a change in weight before and after the immersion was checked. As a result, a decrease in weight due to immersion was 1% or less. That is, it was confirmed that the film cover part had resistance to electrolyte. In Sample No. 100, a film cover part was not disposed.

The RF batteries having a single-cell structure of Sample Nos. 1 and 100 were subjected to a pressure test in which an air pressure of 0.2 MPa was applied for 20 seconds×10,000 times. As a result, in Sample No. 1 in which the film cover part was disposed, a break of the membrane was not observed. In contrast, in Sample No. 100 in which the film cover part was not disposed, a break of the membrane was observed. As is evident from the results, by disposing a film cover part formed of a material having a lower hardness than the protection plate on a corner portion of the membrane side protection plate, even when the thickness of the membrane is small, a break of the membrane can be effectively suppressed.

INDUSTRIAL APPLICABILITY

The redox flow battery according to the present invention can be used as a storage battery, with respect to power generation by natural energy, such as solar photovoltaic power generation and wind power generation, for the purpose of stabilizing variation of power output, storing generated power during oversupply, load leveling, and the like. Furthermore, the redox flow battery according to the present invention can be provided in a general power plant and used as a storage battery as countermeasures against instantaneous power failure/power failure and for the purpose of load leveling.

REFERENCE SIGNS LIST 100, 100α, 100β, 100γ redox flow battery (RF battery)
100C battery cell
101 membrane
102 positive electrode cell
103 negative electrode cell
104 positive electrode
105 negative electrode
106 positive electrode electrolyte tank
107 negative electrode electrolyte tank
108 to 111 conduit
112, 113 pump
200 cell stack
201 end plate
202 rod-shaped body
203 nut
40 cell frame
41, 41A bipolar plate
42, 42A frame body
42c inner peripheral edge recess
42w opening
143, 144 liquid supply manifold
145, 146 liquid discharge manifold
143s, 144s liquid supply slit
145s, 146s liquid discharge slit
127 sealing member
150 protection plate
50 protection plate
50R corner R portion
51 low hardness portion
52 high hardness portion
60 film cover part

The invention claimed is:
1. A redox flow battery comprising:
a pair of adjacent cell frames, each cell frame including a frame body in which a flow channel for an electrolyte is formed, and a bipolar plate disposed inside the frame body;

a positive electrode and a negative electrode disposed so as to face each other between the bipolar plates of the pair of cell frames;

a membrane interposed between the positive electrode and the negative electrode;

a protection plate which covers the flow channel and presses edge portions of the positive electrode or the negative electrode toward the bipolar plate; and a membrane protection structure which prevents the membrane from being broken by contact between the protection plate and the membrane, wherein the membrane protection structure includes a film cover part which is formed of a material having a lower hardness than the protection plate and covers a corner portion of the protection plate interposed between the positive electrode or the negative electrode and the membrane.

2. The redox flow battery according to claim 1, wherein the protection plate and the film cover part are integrated as one body.

3. The redox flow battery according to claim 1, wherein the frame body has a rectangular shape, and the film cover part is disposed at least on long-side sides of the frame body.

4. The redox flow battery according to claim 1, wherein the film cover part has a thickness of 0.005 to 0.5 mm.

5. The redox flow battery according to claim 1, wherein the film cover part includes at least one of a sheet, a porous material, a woven fabric, and a non-woven fabric.

6. The redox flow battery according to claim 1, wherein the film cover part has a type A durometer hardness of 40 to 100.

7. The redox flow battery according to claim 1, wherein the membrane protection structure includes a corner R portion in which a corner portion of the protection plate on the membrane side is rounded, and the corner R portion has a bend radius R of t/2 or more, where t is the thickness of the protection plate.

8. The redox flow battery according to claim 1, wherein the membrane protection structure includes a flexible portion on the membrane side of the protection plate, the flexible portion having a type A durometer hardness of 40 to 100.

* * * * *